United States Patent

Lee

(10) Patent No.: US 6,510,371 B1
(45) Date of Patent: Jan. 21, 2003

(54) SHIFT CONTROL METHOD FOR AUTOMATIC TRANSMISSION

(75) Inventor: Hee-Yong Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/588,691

(22) Filed: Jun. 7, 2000

(30) Foreign Application Priority Data

Jun. 30, 1999 (KR) .............................. 99-26055

(51) Int. Cl.[7] ................... G06F 17/00; G06F 19/00; B60K 41/24
(52) U.S. Cl. ................. 701/64; 701/66; 701/67; 701/68; 192/3.58; 192/3.55; 192/3.63
(58) Field of Search ........................ 701/66, 67, 68, 701/64; 192/3.58, 3.55, 3.63

(56) References Cited

U.S. PATENT DOCUMENTS

| | | | | |
|---|---|---|---|---|
| 4,707,789 A | * | 11/1987 | Downs et al. ................. 701/58 |
| 4,855,913 A | * | 8/1989 | Brekkestran et al. .......... 701/66 |
| 4,913,004 A | * | 4/1990 | Panoushek et al. ........... 74/861 |
| 5,053,960 A | * | 10/1991 | Brekkestran et al. ......... 701/51 |
| 5,449,329 A | * | 9/1995 | Brandon et al. .............. 477/70 |
| 5,551,930 A | * | 9/1996 | Creger et al. ................ 477/130 |
| 5,580,332 A | * | 12/1996 | Mitchell et al. ............. 477/143 |
| 5,842,375 A | * | 12/1998 | Reeves et al. ................ 74/335 |
| 5,853,076 A | * | 12/1998 | McKee et al. .............. 192/87.14 |
| 5,961,422 A | * | 10/1999 | Yasue et al. ................. 477/143 |
| 6,115,661 A | * | 9/2000 | Hosseini et al. .............. 701/51 |

* cited by examiner

Primary Examiner—Jacques H. Louis-Jacques
Assistant Examiner—Brian Broadhead
(74) Attorney, Agent, or Firm—Birch, Stewart, Kolasch & Birch, LLP

(57) ABSTRACT

Disclosed is a shift control method comprising the steps of determining if an input shift signal is a power-on upshift signal; determining if driving conditions satisfy power-on upshift learn conditions if the input shift signal is a power-on upshift signal; performing power-on upshift control if power-on upshift learn conditions are satisfied; learning an initial fill time and completing shifting; determining if shifting is completed; determining if run-up occurred during the shift operation if shifting is completed; determining if interlocking occurred if run-up did not occur; determining, if interlocking occurred, if the interlocking is above a predetermined level; and learning a fill time if the interlocking is above the predetermined level.

4 Claims, 2 Drawing Sheets

SHIFT CONTROL METHOD FOR AUTOMATIC TRANSMISSION

BACKGROUND OF THE INVENTION

1. Field of the Invention

The present invention relates to an automatic transmission for vehicles. More particularly, the present invention relates to a shift control method for an automatic transmission in which a fill time is learned with the occurrence of interlocking generated during power-on upshifting, and the learned fill time is applied during a subsequent power-on upshifting operation such that interlock shock, which occurs at the end of shifting, is prevented.

2. Description of the Related Art

In the automatic transmission used for vehicles, a shift control system performs control to realize automatic shifting into different speeds and shift ranges according to various factors, including throttle opening, vehicle speed and load, and several other engine and driving conditions detected through a plurality of sensors. That is, based on such factors, the shift control system controls a plurality of solenoid valves of a hydraulic control system such that hydraulic flow in the hydraulic control system is controlled, resulting in the shifting of the transmission into the various speeds and shift ranges.

In more detail, when the driver manipulates a shift lever to a particular shift range, a manual valve of the hydraulic control system undergoes port conversion as a result of the manual valve being indexed with the shift lever. By this operation, hydraulic pressure supplied from a hydraulic pump selectively engages a plurality of friction elements of a gearshift mechanism according to the duty control of the solenoid valves, thereby realizing shifting into the desired shift range.

In such an automatic transmission, shift quality is determined by how smoothly the friction elements are engaged and disengaged. Namely, when changing shift ranges, the timing between the engagement of a specific set of friction elements in relation to the disengagement of another specific set of friction elements determines the shift quality of the automatic transmission. Accordingly, there have been ongoing efforts to develop improved shift control methods that enhance shift quality by better controlling the timing of friction elements to engaged and disengaged states.

The different kinds of automatic shifting operations that can be performed in a drive D range according to how the driver operates the vehicle include power-on upshifting, power-on downshifting, power-off upshifting, and power-off downshifting. The present invention relates to a method of controlling power-on upshifting.

In the prior art method, if a power-on upshift signal is input while the vehicle is being driven, power-on upshift control is performed using a pre-installed program. However, as a result of an imprecise clutch gap and a reduction in line pressure at the start of shifting, the timing of the release of clutch pressure and the application of clutch pressure do not correspond such that initial fill time learning is unstable. Accordingly, shift shock as a result of interlocking occurs at the end of shifting.

SUMMARY OF THE INVENTION

The present invention has been made in an effort to solve the above problems.

It is an object of the present invention to provide a shift control method for an automatic transmission in which control is performed according to learned conditions if power-on upshifting occurs, and depending on the degree of interlocking occurring at the end of shifting, it is determined if fill time learning has occurred. If fill time learning has occurred, it is used to reduce shift shock generated by interlocking at the end of shifting during a subsequent power-on upshifting operation.

To achieve the above object, the present invention provides a shift control method comprising the steps of (a) determining if an input shift signal is a power-on upshift signal; (b) determining if driving conditions satisfy power-on upshift learn conditions if the input shift signal is a power-on upshift signal; (c) performing power-on upshift control if power-on upshift learn conditions are satisfied; (d) learning an initial fill time and completing shifting; (e) determining if shifting is completed; (f) determining if run-up occurred during the shift operation if shifting is completed; (g) determining if interlocking occurred if run-up did not occur; (h) determining, if interlocking occurred, if the interlocking is above a predetermined level; and (i) learning a fill time if the interlocking is above the predetermined level.

According to a feature of the present invention, in step (h), if the interlocking is below the predetermined level the fill time is not learned.

According to another feature of the present invention, the learning of the fill time is performed by adding a learned initial fill time, which is learned during a present power-on upshift operation, to a previous initial fill time, which is learned during a previous power-on upshift operation.

According to yet another feature of the present invention, in step (g) of determining if interlocking occurred, if turbine rpm change dNt is less than target turbine rpm dNt1, it is determined that the interlocking is severe.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
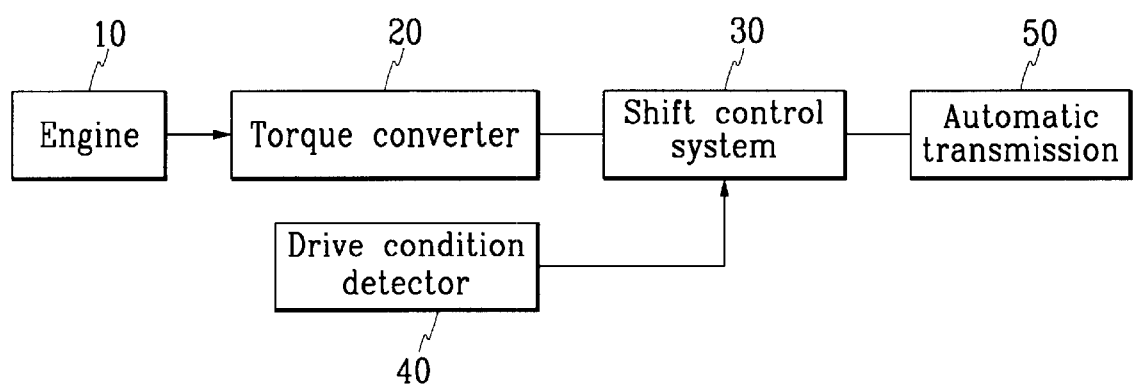
FIG. 1 is a block diagram of a shift control system and related elements to which the present invention is applied.

FIG. 1 shows a block diagram of a shift control system and related elements to which the present invention is applied.

Following the transmission of torque of an engine 10 to a torque converter 20, a rotational speed of a turbine of the torque converter 20 is detected and input to a shift control system 30. Also at this time, a drive condition detector 40 detects overall drive conditions of the vehicle such as throttle opening, vehicle speed, turbine rpm, transmission temperature, engine rpm and brake engagement, and outputs electrical signals corresponding to the detected driving conditions to the shift control system 30.

Using the signals output from the drive condition detector 40, the shift control system 30 determines if power-on upshifting is taking place by determining if the oil temperature is above a predetermined level and if the throttle opening satisfies predetermined learned conditions. If it is determined that power-on upshifting is occurring, a learned fill time is adjusted according to the degree of interlocking.

Figure 2:
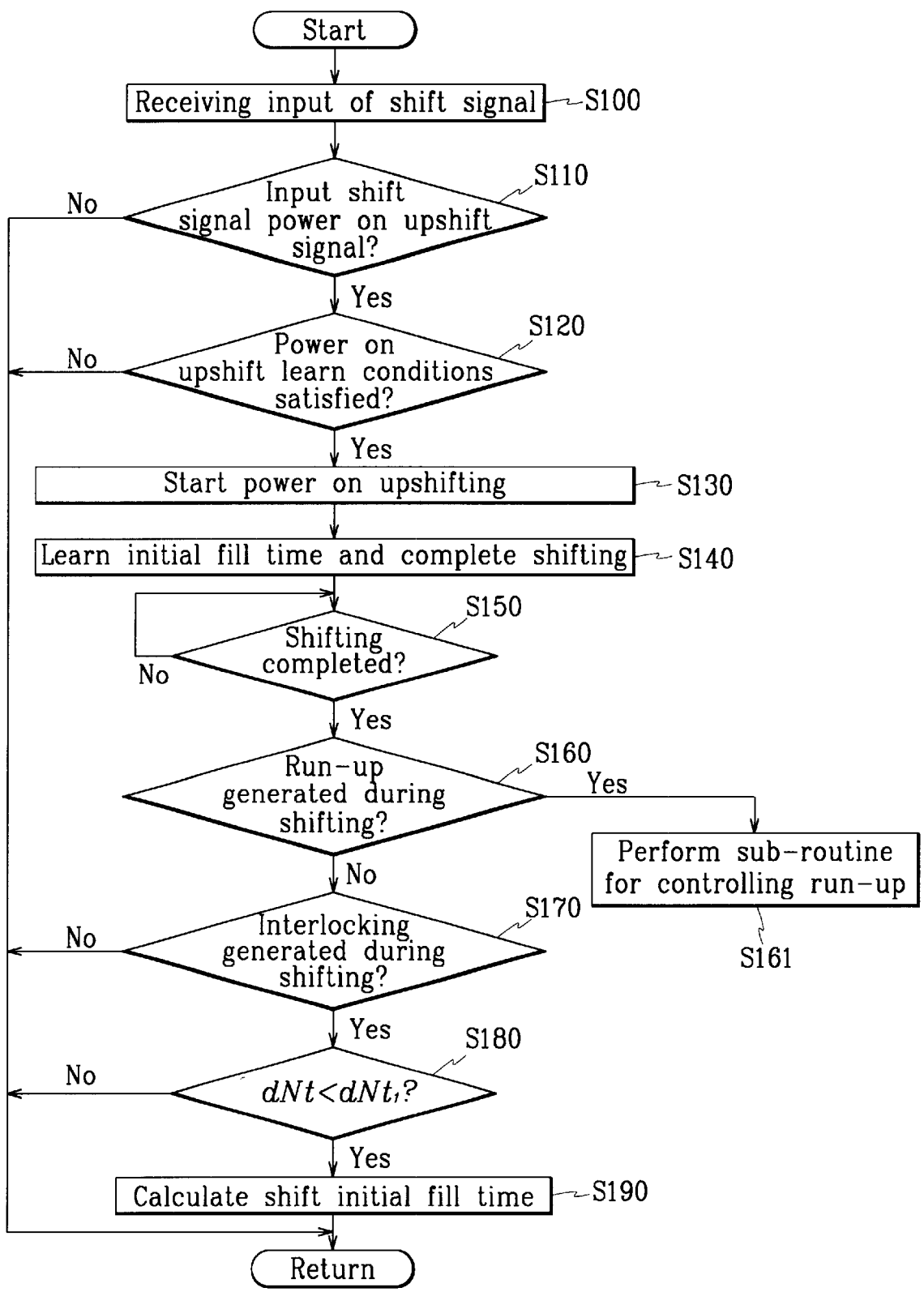
FIG. 2 is a flow chart of a shift control method for an automatic transmission according to a preferred embodiment of the present invention.

FIG. 2 shows a flow chart of a shift control method for an automatic transmission according to a preferred embodiment of the present invention.

First, if a shift signal is input while the vehicle is being driven in step S100, the shift control system 30 detects turbine rpm (Nt) and determines if the input shift signal is a power-on upshift signal in step S110. If it is determined that the input shift signal is a power-on upshift signal, the shift control system 30 then determines if power-on upshift learn conditions are satisfied in step S120. The following are the power-on upshift learn conditions: a temperature of the automatic transmission fluid must be above a predetermined temperature of, for example, 50° C.; a variation in throttle valve opening (Th) value must be minimal, that is, within a predetermined range of ±0.3V; a malfunction code must not be present; and the throttle valve opening (Th) at the time of shifting relative to an output shaft rpm (No) must be within a predetermined power-on range.

If power-on upshift learn conditions are satisfied in step S120, the shift control system 30 performs power-on upshift control according to a power-on upshift shift control pattern stored in a memory in step S130. Next, an initial fill time $\Delta t_F$ is learned and shifting is completed in step S140.

Following the above step, the shift control system 30 determines if shifting is completed in step S150. If shifting is completed, it is determined if run-up occurred during the shift operation in step S160. Run-up is a phenomenon in which turbine rpm (Nt) is abruptly increased by the temporary shifting of the transmission into neutral by the quick exhaust of hydraulic pressure from a disengaged clutch(es) in a state where hydraulic pressure is not fully supplied to an engaged clutch(es). It is determined that run-up occurred if a change in turbine rpm (dNt) is greater than a predetermined target change in turbine rpm (dNt1), which can be determined by counting a target shift speed gearteeth number and comparing this to a vehicle speed.

If it is determined that run-up occurred during shifting in step S160, the shift control system 30 performs a sub-routine for controlling run-up in step S161. However, if it is determined that run-up did not occur, the shift control system 30 determines if interlocking occurred in step S170. If interlocking did occur, it is determined if the change in turbine rpm is less than a predetermined turbine rpm (i.e., dNt<dNt1) in step S180.

If the change in turbine rpm (dNt) is less than the target turbine rpm (dNt1) (i.e., dNt<dNt1), the shift control system 30 determines that the interlocking is severe and calculates a shift initial fill time $t_F$ such that interlocking does not occur in a subsequent power-on upshift operation in step S190. The shift initial fill time $t_F$ is calculated by adding a learned initial fill time $\Delta t_F$, learned during the present power-on upshift operation, to a previous initial fill time $t_{Fold}$, which is learned during a previous power-on upshift operation.

$$t_F = t_{Fold} + \Delta t_F \qquad \text{a.}$$

However, if it is determined that interlocking did not occur in step S170 or if the interlocking that did occur was such that the change in turbine rpm (dNt) is greater than the target turbine rpm (dNt1) (i.e., dNt>dNt1), step S190 of fill time learning does not occur and the process is repeated during the next power-on upshift.

In the shift control method of the present invention as described above, if interlocking is detected during shifting, it is determined if the interlocking exceeds a predetermined level. If it does, fill time learning is performed such that interlocking is prevented for a subsequent power-on upshift operation. Accordingly, shift shock caused by interlocking is reduced to thereby improve ride feel.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control method comprising the steps of:

(a) determining if an input shift signal is a power-on upshift signal;

(b) determining if driving conditions satisfy power-on upshift learn conditions when the input shift signal is a power-on upshift signal;

(c) performing power-on upshift control if power-on upshift learn conditions are satisfied;

(d) learning an initial fill time and completing shifting;

(e) determining if shifting is completed;

(f) determining if run-up occurred during the shift operation when shifting is completed on the basis of change-rate in turbine rpm;

(g) determining if interlocking occurred when run-up did not occur;

(h) determining if the interlocking is above a predetermined level on the basis of change-rate in turbine rpm when interlocking occurred; and (i) learning a fill time if the interlocking is above the predetermined level;

said power-on upshift learn conditions being satisfied, when driving conditions of a temperature of automatic transmission fluid are above a predetermined temperature, a variation in a throttle valve opening is within a predetermined range, a malfunction code is not present and the throttle valve opening at the time of shifting relative to an output shaft rpm is within a predetermined power-on range.

2. The method of claim 1 wherein in step (h), if the interlocking is below the predetermined level the fill time is not learned.

3. The method of claim 1 wherein the learning of the fill time is performed by adding a learned initial fill time, which is learned during a present power-on upshift operation, to a previous initial fill time, which is learned during a previous power on upshift operation.

4. The method of claim 1 wherein in step (h) of determining if interlocking occurred, when change-rate in turbine rpm is less than a target change-rate in turbine rpm it is determined that the interlocking is severe.

* * * * *